United States Patent [19]

Kanno et al.

[11] Patent Number: 5,494,992
[45] Date of Patent: Feb. 27, 1996

[54] (CO)POLYCARBONATE AND PROCESS FOR PRODUCING THE SAME

[75] Inventors: Tatsuya Kanno; Yutaka Hukuda; Yasuhiro Oshino, all of Hyogo, Japan

[73] Assignee: Daicel Chemical Industries, Ltd., Osaka, Japan

[21] Appl. No.: 465,557

[22] Filed: Jun. 1, 1995

Related U.S. Application Data

[62] Division of Ser. No. 188,194, Jan. 28, 1994.

[51] Int. Cl.$^6$ .................................................. C08G 64/00
[52] U.S. Cl. .......................... 528/196; 528/198; 528/199; 528/200
[58] Field of Search ..................................... 528/196, 198, 528/199, 200

[56] References Cited

U.S. PATENT DOCUMENTS

| 4,267,303 | 5/1981 | König et al. | 528/171 |
| 4,383,092 | 5/1983 | Ko et al. | 526/62 |

*Primary Examiner*—James J. Seidleck
*Assistant Examiner*—Terressa Mosley
*Attorney, Agent, or Firm*—Flynn, Thiel, Boutell & Tanis

[57] ABSTRACT

A processes for producing a (co)polycarbonate having a low terminal hydroxyl group concentration and being excellent in heat resistance and hue, which comprises melt-polycondensing a dihydroxy compound with a carbonic diester in the presence of a catalyst for transesterification selected from the group consisting of a nitrogen-containing basic compound, an alkali metal borate and an alkaline earth metal borate and in the presence of a specific ester compound.

A process for producing a linear, high-molecular weight (co)polycarbonate being excellent in heat resistance, hydrolysis resistance, hue and impact resistance which comprises melt-polycondensing a dihydroxy compound with a carbonic diester in the presence of a catalyst for transesterification selected from the group consisting of specific borates.

A process for producing a (co)polycarbonate being excellent in heat resistance, hydrolysis resistance, hue and impact resistance which comprises melt-polycondensing a dihydroxy compound with a carbonic diester in the presence of boric acid and/or ammonium hydrogenphosphite.

7 Claims, No Drawings

(CO)POLYCARBONATE AND PROCESS FOR PRODUCING THE SAME

This is a division of Ser. No. 08/188,194, filed Jan. 28, 1994.

BACKGROUND OF THE INVENTION

1. Field of the Invention

The present invention relates to a (co)polycarbonate having a low terminal hydroxyl group concentration which is obtained by adding an ester compound in the melt-polycondensation of a dihydroxy compound with a carbonic diester in the presence of one or more catalysts selected from among nitrogen-containing basic compounds, alkali metal borates and alkaline earth metal borates to thereby block the terminal hydroxyl group (hydroxyl residue) of the thus formed (co)polycarbonate with an ester group, and a process for producing the same.

The present invention also relates to a (co)polycarbonate composition comprising a borate and a linear, high-molecular weight (co)polycarbonate which is excellent in heat resistance, hydrolysis resistance, hue and impact resistance and which is obtained via polycondensation of a dihydroxy compound with a carbonic diester in the presence of a specific transesterification catalyst, and a process for producing the same.

The present invention further relates to a (co)polycarbonate composition comprising boric acid and/or ammonium hydrogenphosphite and a (co)polycarbonate which is obtained via polycondensation of a dihydroxy compound with a carbonic diester in the presence of a transesterification catalyst, and a process for producing the same.

2. Description of the Related Art

A high-molecular-weight polycarbonate is a general-purpose engineering thermoplastic which is useful in various fields, particularly as injection molding material or sheet material substituting for window panes. It is said that the polycarbonate usually has excellent thermal resistance, transparency and impact resistance.

Generally known processes for producing a polycarbonate include, for example, the phosgene process wherein a dihydroxy compound is reacted with phosgene by interfacial polycondensation and the transesterification process wherein a dihydroxy compound is reacted with a carbonic diester in a molten state.

The phosgene process, i.e., the interfacial polycondensation process, is generally effective in preparing a polycarbonate, but has disadvantages that the use of toxic phosgene is necessitated and that the formed polycarbonate is contaminated with residual chloride ion.

In order to overcome these disadvantages, Japanese Patent Publication-A No. 182336/1988 discloses a process for the preparation of a polycarbonate which comprises using liquid trichloromethyl chloroformate, which is a dimer of phosgene, instead of the toxic phosgene and polycondensing it with a special dihydric phenol by the interfacial process.

However, this patent document does not give any specific information about the special dihydric phenol with the exception of 9,9-bis(4-hydroxyphenyl)fluorenes. Further, although Angew. Chem. 99, 922(1987) describes that a polycarbonate is prepared from 2,2-bis(4-hydroxyphenyl)propane by using triphosgene instead of the toxic phosgene, a reaction mechanism wherein phosgene is generated is also described therein.

A representative transesterification process comprises reacting a dihydric phenol with a carbonic diester in the presence of a transesterification catalyst under heating under reduced pressure while distilling off a phenol formed to prepare a prepolymer and then reacting the prepolymer under heating finally 290° C. or above in a high vacuum while distilling off a phenol formed to obtain a polycarbonate having a high molecular weight (see U.S. Pat. No. 4,845,062).

It is known that in the transesterification process, a prepolymer is prepared in an ordinary tank reactor having stirring blades in the initial stage of the reaction and then the polycondensation reaction is conducted in, for example, a vented horizontal extruder in order to efficiently conduct the reaction to thereby obtain a polycarbonate having a high molecular weight.

However, the transesterification process has the problem that a polycarbonate having a high molecular weight has such an extremely high melt viscosity unlike other engineering plastics that a temperature as high as 280° C. or above is necessitated for the reaction and so is a high vacuum (1 to $10^{-2}$ Torr) for distilling off the monohydroxy compound having a high boiling point formed, which makes the industrialization of the process difficult from the viewpoint of the equipment.

As examples of the polymerization catalysts to be used in the production of polycarbonates by the transesterification process, hydroxides, hydrides, oxides, alcholates, carbonates and acetates of alkali metals and alkaline earth metals are commonly cited. However, there is a problem that these basic catalysts remain in the final products and thus seriously deteriorate the heat resistance, hydrolysis resistance, residence stability in the molding machine, weatherability and hue of the polycarbonates.

One method for solving these problems comprises adding a third component to the reaction mixture to thereby weaken the effectiveness of the basic catalysts. For example, DE Patent No. 1,031,512 (published on Jun. 4, 1958) has disclosed that the above-mentioned problems can be avoided by adding a substance, which is capable of binding to a base, to a molten resin at around the final point of the transesterification to thereby neutralize the basic catalyst. Further, Japanese Patent Publication-A No. 175388/1992 has disclosed a method of adding an acidic compound to a reaction product. However, these methods suffer from another problem that a small amount of an additive can be hardly blended homogeneously with a resin of a high melt viscosity within a short period of time.

Another method for solving the above-mentioned problems comprises altering the type of the catalysts per se. For example, Japanese Patent Publication-B No. 20504/1971 has disclosed a method of adding tetrafluoroborate or hydroxyfluoroborate as the catalyst. However, these catalysts contain halogen atoms, which causes a fear of, for example, the corrosion of devices. Further, Japanese Patent Publication-A No. 124934/1990 has disclosed that the above-mentioned decomposition, i.e., the decomposition of the polycarbonate by heat, hydrolysis or the like, can be prevented by using a nitrogen-containing basic compound together with an alkali metal (or alkaline earth metal) compound and boric acid (or an ester thereof). However, three compounds should be used as the polymerization catalysts in this case, which makes this method troublesome. Furthermore, Japanese Patent Publication-A No. 51719/1985 has disclosed a process for producing a polycarbonate having a relatively light-color with the use of a catalyst system comprising a nitrogen-containing basic compound and a boric compound. However, this catalyst system exhibits low catalytic activity.

Accordingly, it has been urgently required to establish convenient processes for producing a polycarbonate having a low terminal hydroxyl group concentration and a linear high-molecular weight polycarbonate which is excellent in heat resistance, hydrolysis resistance, hue and impact resistance, via polycondensation of a dihydroxy compound with a carbonic diester in the presence of a transesterification catalyst.

DISCLOSURE OF THE INVENTION

Summary of the Invention

The present inventors have found that a high-molecular weight polycarbonate having a low terminal hydroxyl group concentration and being substantially free from chlorine ion can be obtained without using toxic phosgene by adding an ester compound in the step of The melt-polycondensation of a carbonic diester with a dihydroxy compound, generally a dihydric phenol, which are used as compounds for forming a carbonate bond, in the presence of one or more compounds selected from among nitrogen-containing basic compounds, alkali metal borates and alkaline earth metal borates.

Accordingly, the first embodiment of the present invention relates to a process for producing a (co)polycarbonate which comprises melt-polycondensing a dihydroxy compound with a carbonic diester in the presence of a catalyst for transesterification selected from the group consisting of a nitrogen-containing basic compound, an alkali metal borate and an alkaline earth metal borate and in the presence of an ester compound represented by the formula: $R_aCOOR_b$ (wherein $R_a$ represents a phenyl group which may be substituted with a straight-chain or branched alkyl group having 1 to 10 carbon atoms or an aryl group having 8 to 12 carbon atoms; and $R_b$ represents a phenyl group, a straight-chain or branched alkyl group having 1 to 10 carbon atoms or a cyclic alkyl group having 3 to 8 carbon atoms).

The dihydroxy compound is generally a dihydric phenol, and preferably bisphenol A.

The ester compound represented by the formula: $R_aCOOR_b$ is preferably one wherein $R_a$ represents a phenyl group which may be substituted with a branched alkyl group having 5 to 10 carbon atoms or an aryl group having 6 to 12 carbon atoms and $R_b$ represents a phenyl group, a branched alkyl group having 1 to 10 carbon atoms or a cyclic alkyl group having 8 to 8 carbon atoms, or another one wherein $R_a$ represents a phenyl group which may be substituted with a methyl group, a tert-butyl group or an aryl group having 6 to 12 carbon atoms and $R_b$ represents a phenyl group, a branched alkyl group having 1 to 10 carbon atoms or a cyclic alkyl group having 8 to 8 carbon atoms, and still preferably phenyl benzoate.

The ester compound represented by the formula $R_aCOOR_b$ is used in an amount of, per mol of the dihydroxy compound employed, preferably from $10^{-4}$ to $10^{-2}$ mol, still preferably from $10^{-4}$ to below $10^{-2}$ mol, and especially preferably from $10^{-3}$ to below $10^{-2}$ mol.

The ester compound represented by the formula $R_aCOOR_b$ is added to the reaction system preferably before the initiation of the polycondensation or the initial stage of the polycondensation.

The second embodiment of the present invention relates to a (co)polycarbonate having a terminal blocked with an $R_aCO$ group (wherein $R_a$ is as defined above) and a terminal hydroxyl group.

The (co)polycarbonate is preferably one obtained by the process according to the first embodiment of the present invention.

Thus, the present invention includes a polycarbonate, which is obtained by adding an ester compound represented by $R_aCOOR_b$ (wherein $R_a$ represents a phenyl group or a phenyl group substituted with a branched alkyl group having 5 to 10 carbon atoms or substituted with an aryl group having 6 to 12 carbon atoms; and $R_b$ represents a phenyl group, a branched alkyl group having 1 to 10 carbon atoms or a cyclic alkyl group having 8 to 8 carbon atoms) in the melt-polycondensation of a dihydric phenol with a carbonic diester in the presence of one or more catalysts selected form among basic nitrogen compounds, i.e., nitrogen-containing basic compounds, and alkali metal or alkaline earth metal borates to thereby block the terminal hydroxyl group of the thus formed polycarbonate with an $R_aCO$ group (wherein $R_a$ is as defined above), and a process for producing the same.

Further, the present inventors have found that the above-mentioned problems accompanying the conventional art can be solved by using a borate as the polymerization catalyst. A comparison between borates with other basic compounds indicates that they are comparable to each other in the effect of promoting transesterification but the use of the borates significantly suppresses the decomposition of polymers due to heat, water and the like, suggesting a large difference between these substances. Thus it has been found that borates are highly useful as the polymerization catalyst.

Thus, the third embodiment of the present invention relates to a process for producing a (co)polycarbonate which comprises melt-polycondensing a dihydroxy compound with a carbonic diester in the presence of a catalyst for transesterification selected from the group consisting of borates represented by the following general formula: $xM_nO \cdot yB_2O_3 \cdot zH_2O$) [wherein x is an integer of from 1 to 10; y is an integer of from 1 to 10; z is 0 or an integer of from 1 to 10; n is 1 or 2; and M represents an alkali metal ion, an alkaline earth metal ion, a quaternary ammonium ion ($NR_4^+$), a quaternary phosphonium ion ($PR_4^+$) or a tertiary sulfonium ion ($R_3S^+$) (wherein R represents a hydrogen atom, a straight-chain or branched alkyl group or an aromatic group which may be substituted)].

The borates to be used in the present invention are those represented by the formula: $xM_nO \cdot yB_2O_3 \cdot zH_2O$ and the M in the formula represents preferably an alkali metal ion, an alkaline earth metal ion or a quaternary ammonium ion, still preferably an alkali metal ion, and especially preferably a sodium ion, or a lithium ion or a potassium ion.

The borate is preferably used in an amount of from $10^{-8}$ to $10^{-1}$ mol per mol of the dihydroxy compound.

The polycondensation is preferably conducted in the presence of, further, an electron donor amine compound as a transesterification catalyst and the amount of the electron donor amine compound to be used is preferably from $10^{-5}$ to $10^{-1}$ mol per mol of the dihydroxy compound.

Thus, the third embodiment of the present invention includes a process for producing a polycarbonate characterized in that in the melt-polycondensation of a dihydroxy compound with a carbonic diester to produce a polycarbonate, a borate represented by the following general formula:

$$xM_nO \cdot yB_2O_3 \cdot zH_2O$$

(wherein x is an integer of from 1 to 10; y is an integer of from 1 to 10; z is an integer of from 0 to 10; n is an integer of from 1 to 2; and M represents an alkali metal, an alkaline earth metal, a quaternary ammonium, a quaternary phosphonium or a tertiary sulfonium, preferably an alkali metal, an alkaline earth metal or a quaternary ammonium) is used optionally together with an electron donor amine compound as a transesterification catalyst(s).

The fourth embodiment of the present invention relates to a (co)polycarbonate composition comprising a (co)polycarbonate and a borate represented by the following general formula: $xM_nO \cdot yB_2O_3 \cdot zH_2O$ (wherein x, y, z, n and M are as defined above).

The (co)polycarbonate composition is preferably one obtained by the process according to the third embodiment of the present invention.

Furthermore, the present inventors have found that the above-mentioned problems accompanying the conventional art can be solved by using boric acid and/or ammonium hydrogenphosphite in the transesterification.

Thus, the fifth embodiment of the present invention relates to a process for producing a (co)polycarbonate which comprises melt-polycondensing a dihydroxy compound with a carbonic diester in the presence of boric acid and/or ammonium hydrogenphosphite.

The boric acid and/or ammonium hydrogenphosphite is preferably added to the reaction system before the initiation of the polycondensation or the initial stage of the polycondensation.

The polycondensation is generally conducted in the presence of, further, a basic catalyst for transesterification, and the basic catalyst is preferably a metal salt of boric acid, a nitrogen-containing basic compound, an electron donor amine compound or a salt of an electron donor amine compound. Alternatively, the basic catalyst is preferably a compound selected form the group consisting of an alkali metal compound and an alkaline earth metal compound. Further, the basic catalyst may be a mixture of a nitrogen-containing basic compound and a compound selected form the group consisting of an alkali metal compound and an alkaline earth metal compound.

The sixth embodiment of the present invention relates to a (co)polycarbonate composition comprising a (co)polycarbonate and, boric acid and/or ammonium hydrogenphosphite. The (co)polycarbonate composition generally comprises a (co)polycarbonate, a basic compound, i.e., a basic catalyst, and, boric acid and/or ammonium hydrogenphosphite.

The (co)polycarbonate composition preferably comprises a (co)polycarbonate, a metal salt of boric acid and, boric acid and/or ammonium hydrogenphosphite, wherein the total amount of the boron atom of the boric acid and the phosphorus atom of the ammonium hydrogenphosphite is 0.01 to 500 times, advantageously 1 to 500 times and still advantageously 5 to 200 times by mol the amount of the metal atom of the metal salt of boric acid.

The (co)polycarbonate composition preferably comprises a (co)polycarbonate, a nitrogen-containing basic compound and, boric acid and/or ammonium hydrogenphosphite, wherein the total amount of the boron atom of the boric acid and the phosphorus atom of the ammonium hydrogenphosphite is 0.01 to 500 times and advantageously 0.01 to 10 times by mol the amount of the basic group of the nitrogen-containing basic compound.

The (co)polycarbonate composition preferably comprises a (co)polycarbonate, a compound selected form the group consisting of an alkali metal compound and an alkaline earth metal compound and, boric acid and/or ammonium hydrogenphosphite, wherein the total amount of the boron atom of the boric acid and the phosphorus atom of the ammonium hydrogenphosphite is 0.01 to 500 times, preferably 1 to 500 times and still preferably 5 to 200 times by mol that of the metal atoms of the alkali metal compound and the alkaline earth metal compound.

The (co)polycarbonate composition preferably comprises a (co)polycarbonate, a nitrogen-containing basic compound, a compound selected from the group consisting of an alkali metal compound and an alkaline earth metal compound and, boric acid and/or ammonium hydrogenphosphite, wherein the total amount of the boron atom of the boric acid and the phosphorus atom of the ammonium hydrogenphosphite is 0.01 to 500 times by mol that of the basic group of the nitrogen-containing basic compound and the metal atoms of the alkali metal compound and the alkaline earth metal compound.

Furthermore, the (co)polycarbonate composition is preferably one obtained by the process according to the fifth embodiment of the present invention.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Now, the monomers to be used as the raw materials in the present invention will be described.

As representative examples of the carbonic diester to be used in the present invention, diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate are cited. Among these compounds, diphenyl carbonate is a particularly preferable one.

As representative examples of the dihydroxy compound to be used in the present invention, dihydric phenols are cited, and a phenolic compound selected from the group consisting of compounds represented by the following general formulas (1), (2), (3) and (4) is preferably used:

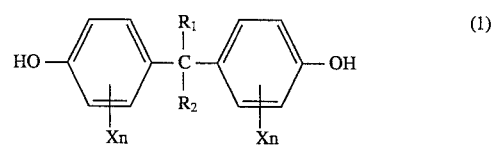

(1)

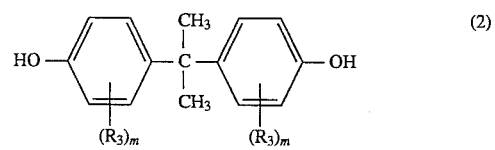

(2)

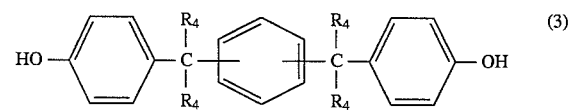

(3)

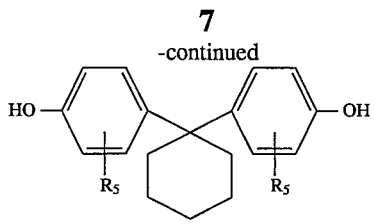

wherein $R_1$, $R_2$, $R_3$, $R_4$ and $R_5$ each represents a straight-chain or branched alkyl group having 1 to 8 carbon atoms or a phenyl group, X represents a halogen atom, n represents 0 or an integer of 1 to 4, and m represents an integer of 1 to 4.

As examples of bisphenols classified into the group represented by the general formula (1), bisphenol A [2,2-bis(4-hydroxyphenyl)propane], 2,2-bis( 4-hydroxyphenyl)butane, 2,2-bis(4-hydroxyphenyl)- 4-methylpentane, 2,2-bis(4-hydroxyphenyl)octane, 4,4'-dihydroxy- 2,2,2-triphenylethane and 2,2-bis(3,5-dibromo- 4-hydroxyphenyl)propane may be cited.

As examples of bisphenols classified into the group represented by the general formula (2), 2,2-bis( 4-hydroxy-3-methylphenyl)propane, 2,2-bis(4-hydroxy- 3-isopropylphenyl)propane, 2,2-bis(4-hydroxy-3-secbutylphenyl)propane, 2,2-bis(3,5-dimethyl-4-hydroxyphenyl)propane and 2,2-bis(4-hydroxy-3-tert-butylphenyl)propane may be cited.

As examples of bisphenols classified into the group represented by the general formula (3), those represented by the following general formula (3') are preferable:

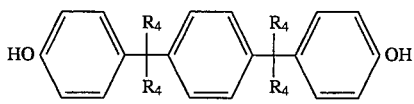

wherein $R_4$ is as defined above.

Examples of bisphenols classified into the group represented by the general formula (8) include 1,1'-bis( 4-hydroxyphenyl)-p-diisopropylbenzene and 1,1'-bis( 4-hydroxyphenyl)-m-diisopropylbenzene.

As an example of bisphenols classified into the group represented by the general formula (4), 1,1-bis( 4-hydroxyphenyl)cyclohexane may be cited.

Furthermore, a (co)polycarbonate can be produced by combining two or more dihydric phenols selected from among those represented by the general formulas (1) to (4).

Next, the first and second embodiments of the present invention will be described.

Representative examples of the nitrogen-containing basic compound usable in the present invention include ammonium hydroxides having an alkyl group, an aryl group and/or an alkylaryl group, such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide [$C_6H_5$-$CH_2(Me)_3NOH$]; tertiary amines such as trimethylamine, triethylamine, dimethylbenzylamine and triphenylamine; secondary amines represented by $R_2NH$ (wherein R represents an alkyl group such as a methyl group and an ethyl group, or an aryl group such as a phenyl group and a tolyl group): primary amines represented by $RNH_2$ (wherein R is as defined above): and basic salts such as ammonia, tetramethylammonium borohydride ($Me_4NBH_4$), tetrabutylammonium borohydride ($Bu_4NH_4$), tetrabutylammonium tetraphenylborate ($Bu_4NBPh_4$) and tetramethylammonium tetraphenylborate ($Me_4NBPh4$).

Additional examples thereof include 4-(4-methyl- 1-piperidinyl)pyridine, N,N-dimethyl-4-aminopyridine, 4-diethylaminopyridine, 4-pyrrolidinopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, benzimidazole, imidazole, 2-methylimidazole, 4-methylimidazole, diazabicyclooctane (DABCO), 1,8-diazabicyclo[5.4.0]-7-undecene (DBU) and 4-(4-methylpyrrolidinyl)pyridine.

Representative examples of the alkali metal borates and alkaline earth metal borates include sodium diborate, sodium tetraborate, sodium pentaborate, sodium hexaborate, sodium octaborate, lithium metaborate, lithium tetraborate, lithium pentaborate, potassium metaborate, potassium tetraborate, potassium pentaborate, potassium hexaborate, potassium octaborate, ammonium metaborate, ammonium tetraborate, ammonium pentaborate, ammonium octaborate, ammonium borate, tetramethylammonium borate, aluminum potassium borate, cadmium borate, silver borate, copper borate, lead borate, nickel borate, magnesium borate and manganese borate.

These transesterification catalysts may be used either singly or combinedly in the first embodiment of the present invention. The catalyst(s) may be added either at once at the feeding of the monomers or in portions during the reaction.

It is required to use the transesterification catalyst in an amount of from $10^{-8}$ to $10^{-1}$ mol, preferably from $10^{-7}$ to $10^{-2}$ mol, per mol of the dihydroxy compound fed in the reaction system. When the amount of the transesterification catalyst is smaller than $10^{-8}$ mol, only a poor catalytic action is achieved, thus resulting in a slow polymerization rate. When it is used in an amount exceeding $10^{-1}$ mol, the catalyst remains at a higher ratio in the reaction mixture comprising a (co)polycarbonate, which deteriorates the physical properties of the (co)polycarbonate.

The process of the first embodiment of the present invention is conducted by adding an ester compound represented by the formula: $R_aCOOR_b$, (wherein $R_a$ represents a phenyl group which may be substituted with a straight-chain or branched alkyl group having 1 to 10 carbon atoms or which may be substituted with an aryl group having 8 to 12 carbon atoms: and $R_b$ represents a phenyl group, a straight-chain or branched alkyl group having 1 to 10 carbon atoms or a cyclic alkyl group having 8 to 8 carbon atoms) in the melt-polycondensation of a dihydroxy compound such as bisphenol A with a carbonic diester with the use of one or more catalysts selected from the group consisting of a nitrogen-containing basic compound, an alkali metal borate and an alkaline earth metal borate.

As examples of the ester compound represented by the formula: $R_aCOOR_b$, phenyl benzoate, phenyl p-methylbenzoate and phenyl p-tert-butylbenzoate may be cited. Among these compounds, phenyl benzoate is a particularly preferable one.

When the polymerization is effected in a high vacuum, an ester compound represented by the formula: $R_cCOOR_b$ (wherein $R_c$ is a lower alkyl group and $R_b$ is as defined above) would be distilled off from the system because $R_c$ is a lower alkyl group. In contrast, an ester compound represented by the formula: $R_aCOOR_b$ (wherein $R_a$ and $R_b$ are as defined above), which is used in the present invention, would not be distilled off from the system in such a case because $R_a$ is a phenyl group which may be substituted. Further, the ester compound represented by the formula: $R_aCOOR_b$ (wherein $R_a$ and $R_b$ are as defined above) gives a thermally stable ester bond in the (co)polycarbonate thus formed.

This ester compound is added in the reaction system in an amount of preferably from $10^{-4}$ to $10^{-2}$ mol, still preferably from $10^{-4}$ to below $10^{-2}$ mol and especially preferably from $10^{-3}$ to below $10^{-2}$ mol per mol of the dihydroxy compound to be used. When the amount of the ester compound exceeds $10^{-2}$ mol, the molecular weight of the (co)polycarbonate to be formed is reduced. By blocking the terminal hydroxyl group of the thus formed (co)polycarbonate with an $R_aCO$ group (wherein $R_a$ is as defined above) by adding the ester compound represented by the formula: $R_aCOOR_b$ (wherein $R_a$ and $R_b$ are as defined above) in the reaction system, a (co)polycarbonate being excellent in heat resistance and hue can be obtained. The ester compound is added to the reaction system preferably before the initiation of the polycondensation or the initial stage of the polycondensation.

The process for producing a (co)polycarbonate according to the first embodiment of the present invention will be described hereinafter in greater detail. First, the reaction temperature ranges from 100° to about 300° C., preferably from 130° to 280° C. A reaction temperature lower than 130° C. results in a slow reaction rate, while one exceeding 800° C. enhances the tendency toward the occurrence of side reactions. The pressure in the reactor in the reaction ranges from atmospheric pressure to 0.1 Torr. When this pressure is excessively high, the monohydroxy compound formed as a side product cannot be efficiently eliminated. When the pressure is excessively low, on the other hand, the carbonic diester and/or dihydroxy compound employed as monomers would be distilled off and the molar ratio of the reactive terminals of the monomers is consequently changed, which makes it difficult to obtain a high-molecular weight (co)polycarbonate. To suppress the distillation of the monomers, it is preferable that the initial polycondensation reactor be provided with a rectification column.

As the material of the polycondensation reactor, those generally used in chemical devices such as stainless steel are usable. In order to obtain an uncolored, high-molecular weight resin, it is preferable that at least 60% of the material where the reaction mixture comes into contact with, i.e., the material constituting the inner surface of the reactor, comprises one or more materials selected from among nickel, chromium and glass.

The carbonic diester should be used at least in an amount equimolar to the dihydroxy compound. In general, 1 mol of a carbonate compound, i.e., the carbonic diester, should react with 1 mol of a dihydroxy compound in order to form a high-molecular weight (co)polycarbonate. When bisphenyl (or diphenyl) carbonate is used as the carbonic diester, 2 mol of phenol is formed by the above-mentioned reaction and distilled off from the reaction system. Although the ester compound is used in the first embodiment of the present invention in order to minimize the terminal hydroxyl group concentration of the (co)polycarbonate to thereby eliminate undesirable effects on the physical properties of the (co)polycarbonate, in particular heat resistance and hue, due to the terminal hydroxyl groups, the molar ratio of the carbonic diester to the dihydroxy compound is also important to minimize the terminal hydroxyl group concentration of the (co)polycarbonate. It is desirable to use the carbonic diester in an amount of from 1.01 to 1.20 mol per mol of the dihydroxy compound.

Definitely, the terminal hydroxyl group concentration of the (co)polycarbonate prepared according to the first embodiment of the present invention or the (co)polycarbonate according to the second embodiment of the present invention ranges preferably from 8 to 30% by mol, still preferably from 10 to 30% by mol. When a terminal hydroxyl concentration is less than 8% by mol, the (co)polycarbonate usually has a reduced molecular weight. When a terminal hydroxyl concentration exceeds 30% by mol, the (co)polycarbonate usually has a deteriorated heat stability. The term "terminal hydroxyl group concentration" means the ratio of the terminal hydroxyl groups to all the terminal groups in the (co)polycarbonate.

The viscosity-average molecular weight (Mv) of the (co)polycarbonate prepared according to the first embodiment of the present invention or the (co)polycarbonate according to the second embodiment of the present invention ranges from 10,000 to 100,000, preferably from 18,000 to 70,000. The hue value thereof is about 0.2 or below, preferably about 0.1 or below. The viscosity-average molecular weight (Mv) is determined from the limiting viscosity number $[\eta]$ of the solution of the reaction mixture comprising the (co)polycarbonate in methylene chloride. The hue value is a difference $(A_{380}-A_{580})$ in the absorbances of a 10 wt. % solution of the reaction mixture comprising the (co)polycarbonate in methylene chloride at 380 nm and 580 nm determined by UV spectrometry.

Next, the third and fourth embodiments of the present invention will be described.

Representative examples of the borates represented by the formula: $xM_nO.yB_2O_3.zH_2O$ (wherein x, y, z, n and M are as defined above) and used as a transesterification catalyst in the third embodiment of the present invention include sodium diborate, sodium tetraborate, sodium pentaborate, sodium hexaborate, sodium octaborate, lithium metaborate, lithium tetraborate, lithium pentaborate, potassium metaborate, potassium tetraborate, potassium pentaborate, potassium hexaborate, potassium octaborate, ammonium metaborate, ammonium tetraborate, ammonium pentaborate, ammonium octaborate, ammonium borate, tetramethylammonium borate, aluminum potassium borate, cadmium borate, silver borate, copper borate, lead borate, nickel borate, magnesium borate and manganese borate. Among them, alkali metal borates are preferable, sodium borate is still preferable, and lithium borate and potassium borate are especially preferable.

Representative examples of the electron donor amine compound usable in the third embodiment of the present invention include N,N-dimethyl-4-aminopyridine (4-dimethylaminopyridine), 4-diethylaminopyridine, 4-pyrrolidinopyridine, 4-aminopyridine, 2-hydroxypyridine, 4-hydroxypyridine, 2-methoxypyridine, 4-methoxypyridine, 2-methoxyimidazole, 1-methylimidazole, imidazole, aminoquinoline, 4-methylimidazole and diazabicyclooctane (DABCO).

A borate or plural borates may be used, and an electron donor amine compound or plural electron donner amine compounds may be used in the third embodiment of the present invention. A borate may be used or a combination of a borate with an electron donor amine compound may be used. The catalyst(s) may be added either at once at the feeding of the monomers or in portions during the reaction.

It is required to use the borate in an amount of from $10^{-8}$ to $10^{-1}$ mol, preferably from $10^{-7}$ to $10^{-2}$ mol, per mol of the dihydroxy compound fed in the reaction system. When the amount of the borate is smaller than $10^{-8}$ mol, only a poor catalytic action is achieved, thus resulting in a slow polymerization rate. When it is used in an amount exceeding $10^{-1}$ mol, the catalyst remains at a higher ratio in the reaction mixture comprising a (co)polycarbonate, which deteriorates the physical properties of the (co)polycarbonate.

It is required to use the electron donor amine compound in an amount of from $10^{-5}$ to $10^{-1}$ mol, preferably from $10^{-4}$ to $10^{-2}$ mol, per tool of the dihydroxy compound fed in the reaction system. When the amount of the electrons donor amine compound is smaller than $10^{-5}$ mol, only a poor catalytic action is achieved, thus resulting in a slow polymerization rate. When it is used in an amount exceeding $10^{-1}$ mol, the catalyst remains at a higher ratio in the reaction mixture comprising a (co)polycarbonate, which deteriorates the physical properties of the (co)polycarbonate.

The process for producing a (co)polycarbonate according to the third embodiment of the present invention will be described hereinafter in greater detail. First, the reaction temperature ranges from 100° to about 300° C., preferably from 180° to 280° C. A reaction temperature lower than 130° C. results in a slow reaction rate, while one exceeding 300° C. enhances the tendency toward the occurrence of side reactions. The pressure in the reactor in the reaction ranges from atmospheric pressure to 0.1 Torr. When this pressure is excessively high, the monohydroxy compound formed as a side product cannot be efficiently eliminated. When the pressure is excessively low, on the other hand, the carbonic diester and/or dihydroxy compound employed as monomers would be distilled off and the molar ratio of the reactive terminals of the monomers is consequently changed, which makes it difficult to obtain a high-molecular weight (co)polycarbonate. To suppress the distillation of the monomers, it is preferable that the initial polycondensation reactor be provided with a rectification column.

As the material of the polycondensation reactor, those generally used in chemical devices such as stainless steel are usable. In order to obtain an uncolored, high-molecular weight resin, it is preferable that at least 60% of the material where the reaction mixture comes into contact with, i.e., the material constituting the inner surface of the reactor, comprises one or more materials selected from among nickel, chromium and glass.

The carbonic diester should be used at least in an amount equimolar to the dihydroxy compound. In general, 1 mol of a carbonate compound, i.e., the carbonic diester, should react with 1 mol of a dihydroxy compound in order to form a high-molecular weight (co)polycarbonate. When bisphenyl (or diphenyl) carbonate is used as the carbonic diester, 2 mol of phenol is formed by the above-mentioned reaction and distilled off from the reaction system. However, the carbonic diester is used in an amount of 1.01 to 1.5 mol, preferably 1.015 to 1.20 mol based on 1 mol of the dihydroxy compound because the carbonic diester as the monomer is sometimes distilled off with the removal of the monohydroxy compound formed as a by-product.

In the third embodiment of the present invention, it is also possible that a carbonic diester compound, an ester compound or a phenol compound is added to the reaction system as a terminal-blocking agent in the above preparation of a (co)polycarbonate from the dihydroxy compound and the carbonic diester in the presence of the transesterification catalyst. The amount of the blocking agent to be used is 0.05 to 10 mole %, preferably 1 to 5 mole % based on the amount of the dihydric compound.

It is thought that the catalyst(s) used remains as such in the reaction mixture obtained, therefore the (co)polycarbonate composition, i.e., the reaction mixture, obtained by the third embodiment of the present invention comprises a (co)polycarbonate, a borate represented by the following general formula: $xM_nO \cdot yB_2O_3 \cdot zH_2O$ (wherein x, y, z, n and M are as defined above) and optionally an electron donor amine compound. Similarly, the (co)polycarbonate composition of the fourth embodiment of the present invention comprises a (co)polycarbonate, a borate represented by the following general formula: $xM_nO \cdot yB_2O_3 \cdot zH_2O$ (wherein x, y, z, n and M are as defined above) and optionally an electron donor amine compound.

Further, the fifth and sixth embodiments of the present invention will be described.

The boric acid includes orthoboric acid, metaboric acid, tetraboric acid and the like.

The boric acid and the ammonium hydrogenphosphite are acidic substances and used to neutralize a basic catalyst in the fifth embodiment of the present invention. The acidic substance may be added in the reaction system at any time. However, the acidic substance is preferably added in the reaction system before the reaction system becomes viscous in order to mix the acidic substance with other components such as starting monomers homogeneously. That is, the acidic substance is preferably added to the reaction system before the initiation of the polycondensation or the initial stage of the polycondensation.

In the fifth embodiment of the present invention, a basic transesterification catalyst is used. Examples of the basic transesterification catalyst include metal salts of boric acid, nitrogen-containing basic compounds, electron amine compounds, salts of the electron amine compounds, alkali metal compounds and alkaline earth metal compounds.

Examples of the metal salts of boric acid include those described as representative examples of the borates with respect to the third embodiment of the present invention. Examples of the nitrogen-containing basic compounds include those described as representative examples of the nitrogen-containing basic compound with respect to the first embodiment of the present invention.

Examples of the electron donor amine compounds include those described as representative examples of the electron donor amine compounds with respect to the third embodiment of the present invention. Examples of the salts of the electron donor amine compounds include borates, acetates, formates, nitrates, nitrites, oxalates, sulfates, phosphates, fluoroborates and hydrogenborates of the above described electron donor amine compounds.

Examples of the alkali metal compounds include sodium hydroxide, lithium hydroxide, potassium hydroxide, sodium hydrogencarbonate, lithium hydrogencarbonate, potassium hydrogencarbonate, sodium carbonate, lithium carbonate, potassium carbonate, sodium acetate, lithium acetate, potassium acetate, sodium stearate, lithium stearate, potassium stearate, sodium borate, lithium borate, potassium borate, sodium borohydride, lithium borohydride, potassium borohydride, sodium borophenylate, sodium benzoate, lithium benzoate, potassium benzoate, disodium hydrogenphosphate, dilithium hydrogenphosphate, dipotassium hydrogenphosphate, disodium salt of bisphenol A, dilithium salt of bisphenol A, dipotassium salt of bisphenol A, sodium phenolate, lithium phenolate and potassium phenolate.

Examples of the alkaline earth metal compounds include barium hydroxide, calcium hydroxide, magnesium hydroxide, strontium hydroxide, barium hydrogencarbonate, calcium hydrogencarbonate, magnesium hydrogencarbonate, strontium hydrogencarbonate, barium carbonate, calcium carbonate, magnesium carbonate, strontium carbonate, barium acetate, calcium acetate, magnesium acetate, strontium acetate, barium stearate, calcium stearate, magnesium stearate, strontium stearate and magnesium borate.

The basic catalyst may be used either singly or combinedly. The catalyst(s) may be added either at once at the feeding of the monomers or in portions during the reaction.

It is required to use the metal salt of boric acid, alkali metal compound or alkaline earth metal compound in an amount of from $10^{-8}$ to $10^{-1}$ mol, preferably from $10^{-7}$ to $10^{-2}$ mol, per mol of the dihydroxy compound fed in the reaction system. When the amount is smaller than $10^{-8}$ mol, only a poor catalytic action is achieved, thus resulting in a slow polymerization rate. When it is used in an amount exceeding $10^{-1}$ mol, the catalyst remains at a higher ratio in the reaction mixture comprising a (co)polycarbonate, which deteriorates the physical properties of the (co)polycarbonate.

It is required to use the nitrogen-containing basic compound including the electron donor amine compound in an amount of from $10^{-5}$ to $10^{-1}$ mol, preferably from $10^{-4}$ to $10^{-2}$ mol, per mol of the dihydroxy compound fed in the reaction system. When the amount is smaller than $10^{-5}$ mol, only a poor catalytic action is achieved, thus resulting in a slow polymerization rate. When it is used in an amount exceeding $10^{-1}$ mol, the catalyst remains at a higher ratio in the reaction mixture comprising a (co)polycarbonate, which deteriorates the physical properties of the (co)polycarbonate.

In the fifth embodiment of the present invention, the basic catalyst and the acidic substance are employed such a ratio that (1) the total amount of the boron atom of the boric acid and the phosphorus atom of the ammonium hydrogenphosphite is 0.01 to 500 times, preferably 1 to 500 times and still preferably 5 to 200 times by mol the amount of the metal atom of the metal salt of boric acid, that (2) the total amount of the boron atom of the boric acid and the phosphorus atom of the ammonium hydrogenphosphite is 0.01 to 500 times, preferably 0.01 to 10 times, by mol the amount of the basic group of the nitrogen-containing basic compound, that (8) the total amount of the boron atom of the boric acid and the phosphorus atom of the ammonium hydrogenphosphite is 0.01 to 500 times, preferably 1 to 500 times and still preferably 5 to 200 times, by mol that of the metal atoms of the alkali metal compound and the alkaline earth metal compound or that (4) the total amount of the boron atom of the boric acid and the phosphorus atom of the ammonium hydrogenphosphite is 0.01 to 500 times by mol that of the basic group of the nitrogen-containing basic compound and the metal atoms of the alkali metal compound and the alkaline earth metal compound. Needless to say, when only one acidic substance, i.e., boric acid or ammonium hydrogenphosphite, is employed, "the total amount of the boron atom of the boric acid and the phosphorus atom of the ammonium hydrogenphosphite" in the above items (1) to (4) means "the amount of the boron atom of the boric acid" or "the amount of the phosphorus atom of the ammonium hydrogenphosphite".

It is thought that the catalyst(s) and acidic substance(s) used remain as such in the reaction mixture, therefore the (co)polycarbonate composition, i.e., the reaction mixture, obtained by the fifth embodiment of the present invention comprises a (co)polycarbonate, a catalyst and an acidic substance.

It is also thought that the ratio between the amounts of the catalyst and the acidic substance in the (co)polycarbonate composition, i.e., the reaction mixture, obtained by the fifth embodiment of the present invention is the same as that of employed, i.e., the ratio between the amounts of the catalyst and the acidic substance fed.

The process for producing a (co)polycarbonate according to the fifth embodiment of the present invention is the same as that of the third embodiment of the present invention, except that an acidic substance is used and the kind of the catalyst is not limited.

The (co)polycarbonate composition of the sixth embodiment of the present invention comprises a (co)polycarbonate, a catalyst and an acidic substance. The ratio between the amounts of the catalyst and the acidic substance in the (co)polycarbonate composition of the sixth embodiment of the present invention is preferably as follows:

(1) the total amount of the boron atom of the boric acid and the phosphorus atom of the ammonium hydrogenphosphite is 0.01 to 500 times, preferably 1 to 500 times and still preferably 5 to 200 times, by mol the amount of the metal atom of the metal salt of boric acid, (2) the total amount of the boron atom of the boric acid and the phosphorus atom of the ammonium hydrogenphosphite is 0.01 to 500 times, preferably 0.01 to 10 times by mol the amount of the basic group of the nitrogen-containing basic compound, (3) the total amount of the boron atom of the boric acid and the phosphorus atom of the ammonium hydrogenphosphite is 0.01 to 500 times, preferably 1 to 500 times and still preferably 5 to 200 times, by mol that of the metal atoms of the alkali metal compound and the alkaline earth metal compound, or (4) the total amount of the boron atom of the boric acid and the phosphorus atom of the ammonium hydrogenphosphite is 0.01 to 500 times by mol that of the basic group of the nitrogen-containing basic compound and the metal atoms of the alkali metal compound and the alkaline earth metal compound.

The acidic substance neutralizes the basic catalyst and therefore reduces the unfavorable influences which may be caused by the basic catalyst remaining in the reaction mixture.

EXAMPLES

The present invention will now be described in more detail with reference to the following Examples which should not be considered to limit the scope of the present invention.

First, a description will be made on the methods for the determinations and evaluations of the hue, viscosity-average molecular weight (Mv), terminal hydroxyl group concentration based on all the terminal groups and glass transition point, and the heat aging tests (storage stability tests) and hydrolysis test described in the following Examples and Comparative Examples.

Hue:

The hue was evaluated by determining a difference $(A_{380}-A_{580})$ in the absorbances of a 10 wt. % solution of the reaction mixture comprising the (co)polycarbonate in methylene chloride at 880 nm and 580 nm by UV spectrometry.

Viscosity-average molecular weight (Mv):

The limiting viscosity number $[\eta]$ of the solution of the reaction mixture comprising the (co)polycarbonate in methylene chloride was determined with an Ubbelohde's viscometer at 20° C. The concentration of the reaction mixture in the solution was 0.5 g/dl. The viscosity-average molecular weight of the (co)polycarbonate was calculated from the limiting viscosity number $[\eta]$ determined according to the following formula:

$$[\eta]=1.11\times10^{-4}\ Mv^{0.82}$$

Terminal hydroxyl group concentration of the (co)polycarbonate based On all the terminal groups thereof:

The reaction mixture comprising the (co)polycarbonate was dissolved in heavy chloroform to prepare a 5 wt. % solution thereof. The terminal hydroxyl group concentration was determined with the solution according to $^{13}$C-NMR spectrometry.

Glass transition point:

Glass transition point was measured with the use of differential scanning calorimeter (Perkin-Elmer 2C).

Heat aging test:
(a) Number of cleavages

A test piece was prepared by pressing the reaction mixture comprising the (co)polycarbonate in a molten state and allowed to stand in an oven at 160° C. for 10, 20 or 80 days. Then the molecular weight loss was evaluated based on the number of cleavages of the (co)polycarbonate, i.e., ($Mv_0/Mv_t$) minus 1 (wherein $Mv_0$ represents the viscosity-average molecular weight of the (co)polycarbonate constituting the test piece before the initiation of the test and $Mv_t$ the one t days after the initiation of the test). The process for determining the viscosity-average molecular weight was the same as that described above. A number of cleavages of 1.0 means that each polymer chain of the (co)polycarbonate has been cleaved once on average and thus the (co)polycarbonate is halved in molecular weight.

(b) Hue

The hue (YI) of each reaction mixture comprising the (co)polycarbonate was determined on a color difference meter (mfd. by Nippon Denshoku, 300A) by the use of a sheet [50×50×2 mm (H-W-D)] prepared by the hot pressing quenching process, before and after storage at 160° C. for 720 hours.

Hydrolysis test:

A test piece was prepared in the same manner as that employed in the above heat aging test (a). After allowing to stand at 100° C. under 100% RH for 10 days, the molecular weight loss is evaluated based on the number of cleavages in the same manner as that employed in the above heat aging test (a).

Example I-1

Into a nickel-lined Tank reactor were fed 4580 g (20 mol) of bisphenol A [2,2-bis-(4-hydroxyphenyl)propane], 4391.5 g (20.5 mol) of diphenyl carbonate, 489 mg ($4\times10^{-3}$ mol) of N,N-dimethyl-4-aminopyridine and 19.8 g (0.1 mol) of phenyl benzoate. After melting at 180° C. and stirring for 1 hour in a nitrogen atmosphere, The mixture was heated while slowly reducing the pressure until The temperature and the pressure finally reached respectively 270° C. and 1.1 Torr and polycondensation was effected for 4 hours under stirring under those conditions with the removal of formed phenol by distillation. The reaction mixture was further reacted in a vertical, double-screw, self-cleaning reactor under 0.1 Torr and 280° C. for 50 minutes with The removal of formed phenol. Thus a colorless and transparent reaction mixture comprising a polycarbonate was obtained.

The hue value ($A_{380}-A_{580}$) of The reaction mixture was 0.09. The polycarbonate had a viscosity-average molecular weight (Mv) of 28,000 and a terminal hydroxyl group concentration of 28 molar % based on all the terminal groups of The polycarbonate, which was calculated by using the amounts of phenolic Terminals and phenyl Terminals determined by $^{13}$C-NMR spectroscopy.

Example I-2

A polycondensation was effected under the same conditions as those employed in Example I-1 except that 29 mg ($1.44\times10^{-4}$ mol) of sodium tetraborate was used as the transesterification catalyst instead of the N,N-dimethyl-4-aminopyridine. Thus a colorless and transparent reaction mixture comprising a polycarbonate was obtained.

The hue value ($A_{380}-A_{580}$) of the reaction mixture was 0.10. The polycarbonate had a viscosity-average molecular weight (Mv) of 29,000 and a terminal hydroxyl group concentration of 19 molar % based on all the terminal groups of the polycarbonate.

Example I-3

A polycondensation was effected under the same conditions as those employed in Example I-1 except that 29 mg ($1.44\times10^{-4}$ mol) of sodium tetraborate and 48.9 mg ($4\times10^{-4}$ mol) of N,N-dimethyl-4-aminopyridine were used as the transesterification catalysts instead of 489 mg of the N,N-dimethyl-4-aminopyridine. Thus a colorless and transparent reaction mixture comprising a polycarbonate was obtained.

The hue value ($A_{380}-A_{580}$) of the reaction mixture was 0.09. The polycarbonate had a viscosity-average molecular weight (Mv) of 82,000 and a terminal hydroxyl group concentration of 20 molar % based on all the terminal groups of the polycarbonate.

Example I-4

Into a nickel-lined tank reactor were fed 2283 g (10 mol) of bisphenol A, 8400 g (10 mol) of 2,2-bis(4-hydroxy-3-tert-butylphenyl)propane, 4391.5 g (20.5 mol) of diphenyl carbonate, 2.9 mg ($1.44\times10^{-5}$ mol) of sodium diborate, 48.9 mg ($4\times10^{-4}$ mol) of N,N-dimethyl- 4-aminopyridine and 19.8 g (0.1 mol) of phenyl benzoate. A polycondensation was effected in the same manner as that employed in Example I-1. Thus a colorless and transparent reaction mixture comprising a copolycarbonate was obtained.

The hue value ($A_{380}-A_{580}$) of the reaction mixture was 0.09. The copolycarbonate had a viscosity-average molecular weight (Mv) of 23,400 and a terminal hydroxyl group concentration of 21 molar % based on all the terminal groups of the copolycarbonate.

Comparative Example I-1

A polycondensation was effected under the same conditions as those employed in Example I-1 except that no phenyl benzoate was added. Thus a colorless and transparent reaction mixture comprising a polycarbonate was obtained.

The hue value ($A_{380}-A_{580}$) of the reaction mixture was 0.10. The polycarbonate had a viscosity-average molecular weight (Mv) of 29,000 and a terminal hydroxyl group concentration of 52 molar % based on all the terminal groups of the polycarbonate.

Comparative Example I-2

A polycondensation was effected under the same conditions as those employed in Example I-2 except that no phenyl benzoate was added. Thus a colorless and transparent reaction mixture comprising a polycarbonate was obtained.

The hue value ($A_{380}-A_{580}$) of the reaction mixture was 0.13. The polycarbonate had a viscosity-average molecular weight (Mv) of 31,000 and a terminal hydroxyl group concentration of 48 molar % based on all the terminal groups of the polycarbonate.

Table 1 shows the results of the heat aging test (a) and the hydrolysis test performed with the use of the reaction mixtures obtained in the above Examples I-1, I-2, I-3 and I-4 and Comparative Examples I-1 and I-2.

TABLE 1

|  | Ex. I-1 | Ex. I-2 | Ex. I-3 | Ex. I-4 | Comp. Ex. I-1 | Comp. Ex. I-2 |
| --- | --- | --- | --- | --- | --- | --- |
| Heat aging test (a) ($t_{10}$) | 0.05 | 0.07 | 0.04 | 0.05 | 0.34 | 0.88 |
| Hydrolysis test | 0.03 | 0.01 | 0.03 | 0.04 | 0.31 | 0.73 |

Example II-1

Into a glass flask were fed 22.8 g (0.1 mol) of 2,2-bis(4-hydroxyphenyl)propane, 21.9 g (0.1025 mol) of diphenyl carbonate and 0.145 mg ($7.2 \times 10^{-7}$ mol) of sodium tetraborate. After melting at 180° C. in a nitrogen atmosphere, the mixture was heated while slowly reducing the pressure until the temperature and pressure finally reached respectively 270° C. and 0.1 Torr under thoroughly stirring and polycondensation was effected under those conditions with the removal of formed phenol by distillation. Thus a colorless and transparent reaction mixture comprising a polycarbonate was obtained.

The hue value ($A_{380}-A_{580}$) of the reaction mixture was 0.09. The polycarbonate had a viscosity-average molecular weight (My) of 29,000.

Example II-2

A polycondensation was effected under the same conditions as those employed in Example II-1 except that 0.268 mg ($7.2 \times 10^{-7}$ mol) of potassium octaborate was used as the transesterification catalyst instead of the sodium tetraborate. Thus a colorless and transparent reaction mixture comprising a polycarbonate was obtained.

The hue value ($A_{380}-A_{580}$) of the reaction mixture was 0.08. The polycarbonate had a viscosity-average molecular weight (My) of 28,000.

Example II-3

A polycondensation was effected under the same conditions as those employed in Example II-1 except that 2.4 mg ($2 \times 10^{-5}$ mol) of N,N-dimethyl-4-aminopyridine as the transesterification catalyst was further added. Thus a colorless and transparent reaction mixture comprising a polycarbonate was obtained.

The hue value ($A_{380}-A_{580}$) of the reaction mixture was 0.09. The polycarbonate had a viscosity-average molecular weight (Mv) of 28,500.

Example II-4

Into a glass flask were fed 11.4 g (0.05 mol) of 2,2-bis(4-hydroxyphenyl)propane, 17.0 g (0.05 mol) of 2,2-bis(4-hydroxy-8-tert-butylphenyl)propane, 22.5 g (0.105 mol) of diphenyl carbonate, 0.097 mg ($5 \times 10^{-7}$ mol) of sodium diborate and 0.068 g ($1 \times 10^{-3}$ mol) of imidazole. A polycondensation was effected in the same manner as that employed in Example II-1. Thus a colorless and transparent reaction mixture comprising a copolycarbonate was obtained.

The hue value ($A_{380}-A_{580}$) of the reaction mixture was 0.09. The copolycarbonate had a viscosity-average molecular weight (Mv) of 23,400.

Comparative Example II-1

A polycondensation was effected under the same conditions as those employed in Example II-1 except that 0.040 mg ($7.2 \times 10^{-7}$ mol) of potassium hydroxide was used as the transesterification catalyst instead of the sodium tetraborate. Thus a colorless and transparent reaction mixture comprising a polycarbonate was obtained.

The hue value ($A_{380}-A_{580}$) of the reaction mixture was 0.09. The polycarbonate had a viscosity-average molecular weight (My) of 25,000.

Comparative Example II-2

A polycondensation was effected under the same conditions as those employed in Example II-1 except that 0.041 mg ($5 \times 10^{-7}$ mol) of sodium acetate was used as the transesterification catalyst instead of the sodium tetraborate. Thus a colorless and transparent reaction mixture comprising a polycarbonate was obtained.

The hue value ($A_{380}-A_{580}$) of the reaction mixture was 0.09. The polycarbonate had a viscosity-average molecular weight (Mv) of 25,000.

Table 2 shows the results of the heat aging test (a) and the hydrolysis test performed with the use of the reaction mixtures obtained in the above Examples II-1, II-2, II-8 and II-4 and Comparative Examples II-1 and II-2.

As Table 2 shows, it was confirmed that the polycarbonates prepared in Comparative Examples II-1 and II-2 were decomposed in the heat aging test (a) and the hydrolysis test.

TABLE 2

|  | Ex. II-1 | Ex. II-2 | Ex. II-3 | Ex. II-4 | Comp. Ex. II-1 | Comp. Ex. II-2 |
| --- | --- | --- | --- | --- | --- | --- |
| Heat aging test (a) ($t_{10}$) | 0.05 | 0.06 | 0.04 | 0.05 | 0.86 | 1.12 |
| Hydrolysis test | 0.03 | 0.02 | 0.03 | 0.04 | 0.76 | 0.88 |

Example III-1

Into a glass flask were fed 22.8 g (0.1 mol) of 2,2-bis(4-hydroxyphenyl)propane, 21.9 g (0.1025 mol) of diphenyl carbonate and an aqueous solution of 0.085 mg ($1 \times 10^{-5}$ mol) of lithium metaborate dihydrate. After melting at 180° C. in a nitrogen atmosphere, the mixture was heated while slowly reducing the pressure until the temperature and pressure finally reached respectively 270° C. and 0.1 Torr under thoroughly stirring and polycondensation was effected under those conditions with the removal of formed phenol by distillation. Thus a colorless and transparent reaction mixture comprising a polycarbonate was obtained.

The hue value ($A_{380}-A_{580}$) of the reaction mixture was 0.07. The polycarbonate had a viscosity-average molecular weight (Mv) of 29,500.

Example III-2

A polycondensation was effected under the same conditions as those employed in Example III-1 except that 0.268 mg ($7.2 \times 10^{-7}$ mol) of potassium octaborate was used as the transesterification catalyst instead of the lithium metaborate dihydrate. Thus a colorless and transparent reaction mixture comprising a polycarbonate was obtained.

The hue value ($A_{380}-A_{580}$) of the reaction mixture was 0.08. The polycarbonate had a viscosity-average molecular weight (Mv) of 30,000.

Example III-3

A polycondensation was effected under the same conditions as those employed in Example III-1 except that 0.145 mg ($7.2\times10^{-7}$ mol) of sodium tetraborate was used as the transesterification catalyst instead of the lithium metaborate dihydrate. Thus a colorless and transparent reaction mixture comprising a polycarbonate was obtained.

The hue value ($A_{380}-A_{580}$) of the reaction mixture was 0.11. The polycarbonate had a viscosity-average molecular weight (Mv) of 24,000.

Example III-4

A polycondensation was effected under the same conditions as those employed in Example III-1 except that 2.4 mg ($2\times10^{-5}$ mol) of N,N-dimethyl-4-aminopyridine as the transesterification catalyst was further added. Thus a colorless and transparent reaction mixture comprising a polycarbonate was obtained.

The hue value ($A_{380}-A_{580}$) of the reaction mixture was 0.09. The polycarbonate had a viscosity-average molecular weight (Mv) of 33,000.

Example III-5

Into a glass flask were fed 11.4 g (0.05 mol) of 2,2-bis(4-hydroxyphenyl)propane, 17.0 g (0.05 mol) of 2,2-bis(4-hydroxy-3-tert-butylphenyl)propane, 22.5 g (0.105 mol) of diphenyl carbonate, 0.268 mg ($7.2\times10^{-7}$ mol) of potassium octaborate and 0.068 g ($1\times10^{-3}$ mol) of imidazole. A polycondensation was effected in the same manner as that employed in Example III-1. Thus a colorless and transparent reaction mixture comprising a copolycarbonate was obtained.

The hue value ($A_{380}-A_{580}$) of the reaction mixture was 0.09. The copolycarbonate had a viscosity-average molecular weight (Mv) of 23,400.

Comparative Example III-1

A polycondensation was effected under the same conditions as those employed in Example III-1 except that 0.040 mg ($7.2\times10^{-7}$ mol) of potassium hydroxide was used as the transesterification catalyst instead of the lithium metaborate dihydrate. Thus a colorless and transparent reaction mixture comprising a polycarbonate was obtained.

The hue value ($A_{380}-A_{580}$) of the reaction mixture was 0.10. The polycarbonate had a viscosity-average molecular weight (Mv) of 25,000.

Comparative Example III-2

A polycondensation was effected under the same conditions as those employed in Example III-1 except that 0.041 mg ($5\times10^{31\ 1}$ mol) of sodium acetate was used as the transesterification catalyst instead of the lithium metaborate dihydrate. Thus a colorless and transparent reaction mixture comprising a polycarbonate was obtained.

The hue value ($A_{380}-A_{580}$) of the reaction mixture was 0.10. The polycarbonate had a viscosity-average molecular weight (My) of 25,000.

Table 3 shows the results of the heat aging test (a) and the hydrolysis test performed with the use of the reaction mixtures obtained in the above Examples III-1, III-2, III-3, III-4 and III-5 and Comparative Examples III-1 and III-2.

As Table 3 shows, it was confirmed that the polycarbonates prepared in Comparative Examples III-1 and III-2 were decomposed in the heat aging test (a) and the hydrolysis test.

TABLE 3

| | Ex. III-1 | Ex. III-2 | Ex. III-3 | Ex. III-4 | Ex. III-5 | Comp. Ex. III-1 | Comp. Ex. III-2 |
|---|---|---|---|---|---|---|---|
| Heat aging test (a) ($t_{10}$) | 0.03 | 0.03 | 0.05 | 0.04 | 0.04 | 0.86 | 1.12 |
| Hydrolysis test | 0.03 | 0.02 | 0.04 | 0.03 | 0.04 | 0.76 | 0.88 |

Example IV-1

Into a nickel-lined tank reactor were fed 4560 g (20 mol) of 2,2-bis(4-hydroxyphenyl)propane, 4391.5 g (20.5 mol) of diphenyl carbonate, 38 mg ($1\times10^{-4}$ mol) of sodium tetraborate and 30.9 mg ($5\times10^{-4}$ mol) of boric acid. After melting at 160° C. and stirring for 1 hour in a nitrogen atmosphere, the mixture was heated while slowly reducing the pressure until the temperature and the pressure finally reached respectively 270° C. and 1 Torr and polycondensation was effected for 4 hours under stirring under those conditions with the removal of formed phenol by distillation. The reaction mixture was further reacted in a vertical, double-screw, self-cleaning reactor under 0.1 Torr and 280° C. for 50 minutes with the removal of formed phenol. Thus a colorless and transparent reaction mixture comprising a polycarbonate was obtained.

The polycarbonate had a viscosity-average molecular weight (My) of 35,000 and a terminal hydroxyl group concentration of 18 molar % based on all the terminal groups of the polycarbonate.

Example IV-2

A polycondensation was effected in the same manner as that employed in Example IV-1 except that 489 mg ($4\times10^{-3}$ mol) of N,N-dimethyl-4-aminopyridine was used as the transesterification catalyst instead of the sodium tetraborate and that the amount of the boric acid used was 1.2366 g ($2\times10^{-2}$ mol). Thus a colorless and transparent reaction mixture comprising a polycarbonate was obtained.

The polycarbonate had a viscosity-average molecular weight (Mv) of 29,000 and a terminal hydroxyl group concentration of 18 molar % based on all the terminal groups of the polycarbonate.

Example IV-3

Into a glass flask were fed 22.8 g (0.1 mol) of 2,2-bis(4-hydroxyphenyl)propane, 21.96 g (0.1025 mol) of diphenyl carbonate, $2\times10^{-5}$ g [$5\times10^{-6}$ mol/1 mol of the 2,2-bis(4-hydroxyphenyl)propane] of lithium hydroxide monohydrate and $1\times10^{-3}$ g ($1.6\times10^{-5}$ mol) of boric acid. After melting at 180° C. and stirring for 1 hour in a nitrogen atmosphere, the mixture was heated while slowly reducing the pressure until the temperature and the pressure finally reached respectively 270° C. and 0.1 Torr and polycondensation was effected for 1 hour under stirring under those conditions with the removal of formed phenol by distillation. Thus a colorless and transparent reaction mixture comprising a polycarbonate was obtained.

The polycarbonate had a viscosity-average molecular weight (My) of 27,600, a terminal hydroxyl group concentration of 28 molar % based on all the terminal groups of the polycarbonate and a glass transition point of 150° C.

Example IV-4

Into a glass flask were fed 22.8 g (0.1 mol) of 2,2-bis(4-hydroxyphenyl)propane, 21.96 g (0.1025 mol) of diphenyl carbonate, 01.00122 g [$1\times10^{-4}$ mol/1 mol of the 2,2-bis(4-hydroxyphenyl)propane] of N,N-dimethyl- 4-aminopyridine, 0.000042 g [$1\times10^{-5}$ mol/1 mol of the 2,2-bis(4-hydroxyphenyl)propane] of lithium hydroxide and 3.5 mg ($5.7\times10^{-5}$ mol) of boric acid. After melting at 180° C. and stirring for 1 hour in a nitrogen atmosphere, the mixture was heated while slowly reducing the pressure until the temperature and the pressure finally reached respectively 270° C. and 0.1 Torr and polycondensation was effected for 1 hour under stirring under those conditions with the removal of formed phenol by distillation. Thus a colorless and transparent reaction mixture comprising a polycarbonate was obtained.

The polycarbonate had a viscosity-average molecular weight (My) of 27,600, a terminal hydroxyl group concentration of 28 molar % based on all the terminal groups of the polycarbonate and a glass transition point of 150° C.

Example IV-5

A polycondensation was effected in the same manner as that employed in Example IV-1 except that 489 mg ($4\times10^{-3}$ mol) of N,N-dimethyl-4-aminopyridine was used as the transesterification catalyst instead of the sodium tetraborate and that 1.98 g ($2\times10^{-2}$ mol) of ammonium hydrogenphosphite was used as the acidic substance instead of the boric acid. Thus a colorless and transparent reaction mixture comprising a polycarbonate was obtained.

The polycarbonate had a viscosity-average molecular weight (My) of 26,000 and a terminal hydroxyl group concentration of 23 molar % based on all the terminal groups of the polycarbonate.

Example IV-6

A polycondensation was effected in the same manner as that employed in Example IV-1 except that the amount of the boric acid used was 1.5458 g ($2.5\times10^{-2}$ mol). Thus a colorless and transparent reaction mixture comprising a polycarbonate was obtained.

The polycarbonate had a viscosity-average molecular weight (Mv) of 26,700 and a terminal hydroxyl group concentration of 6 molar % based on all the terminal groups of the polycarbonate.

Example IV-7

A polycondensation was effected in the same manner as that employed in Example IV-2 except that the amount of the boric acid used was 12.866 g ($2\times10^{-1}$ mol). Thus a colorless and transparent reaction mixture comprising a polycarbonate was obtained.

The polycarbonate had a viscosity-average molecular weight (Mv) of 24,600 and a terminal hydroxyl group concentration of 14 molar % based on all the terminal groups of the polycarbonate.

Table 4 shows the results of the heat aging tests performed with the use of the reaction mixtures obtained in the above Examples IV-1, IV-2, IV-3, VI-4, IV-5, IV-6 and IV-7.

TABLE 4

|  |  | Ex. IV-1 | Ex. IV-2 | Ex. IV-3 | Ex. IV-4 | Ex. IV-5 | Ex. IV-6 | Ex. IV-7 |
| --- | --- | --- | --- | --- | --- | --- | --- | --- |
| Heat aging test (a) | no. of cleavages after 10 days ($t_{10}$) | 0.01 | 0.03 | — | — | 0.08 | 0.03 | 0.02 |
|  | no. of cleavages after 20 days ($t_{20}$) | 0.05 | 0.06 | — | — | 0.10 | 0.08 | 0.08 |
|  | no. of cleavages after 30 days ($t_{30}$) | 0.05 | 0.08 | — | — | 0.10 | 0.09 | 0.09 |
| Heat aging test (b) | initial hue (YI) | 1.0 | 1.0 | 1.5 | 1.5 | 1.4 | 1.2 | 1.2 |
|  | hue after storage (YI) | 12 | 12 | 10.8 | 11.3 | 14 | 14 | 14 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. In a process for producing a (co)polycarbonate by the melt polycondensation of a dihydroxy compound with a carbonic diester, the improvement comprising conducting said melt polycondensation at a temperature of 100°–300° C. and a pressure of atmospheric to 0.1 Torr in the presence of an acidic substance selected from the group consisting of boric acid, ammonium hydrogenphosphite and a mixture thereof and a basic transesterification catalyst selected from the group consisting of a metal salt of boric acid, a nitrogen-containing basic compound, an electron donor amine compound, a salt of an electron donor amine compound, an alkali metal compound, an alkaline earth metal compound, a mixture of a nitrogen-containing basic compound and an alkali metal compound and a mixture of a nitrogen containing basic compound and an alkaline earth metal compound, said basic catalyst and the acidic substance are employed at such a ratio that (1) total amount of the boron atom of the boric acid and the phosphorus atom of the ammonium hydrogenphosphite is 0.01 to 500 times by mol the amount of the metal atom of the metal salt of boric acid, that (2) the total amount of the boron atom of the boric acid and the phosphorus atom of the ammonium hydrogenphosphite is 0.01 to 500 times by mol the amount of the basic group of the nitrogen-containing basic compound, that (3) the total amount of the boron atom of the boric acid and the phosphorus atom of the ammonium hydrogenphosphite is 0.01 to 500 times by mol that of the metal atoms of the alkali metal compound and the alkaline earth metal compound or that (4) the total amount of the boron atom of the boric acid and the phosphorus atom of the ammonium hydrogenphosphite is 0.01 to 500 times by mol that of the basic group of the nitrogen-containing basic compound and the metal atoms of the alkali metal compound and the alkaline earth metal compound.

2. The process for producing a (co)polycarbonate as claimed in claim 1, wherein the boric acid and/or ammonium hydrogenphosphite is added to the reaction system before the initiation of the polycondensation or during the initial stages of the polycondensation.

3. The process for producing a (co)polycarbonate as claimed in claim 1 wherein the basic catalyst is a metal salt of boric acid.

4. The process for producing a (co)polycarbonate as claimed in claim 1 wherein the basic catalyst is a nitrogen-containing basic compound.

5. The process for producing a (co)polycarbonate as claimed in claim 1 wherein the basic catalyst is an electron doner amine compound or a salt thereof.

6. The process for producing a (co)polycarbonate as claimed in claim 1 wherein the basic catalyst is a compound selected form the group consisting of an alkali metal compound and an alkaline earth metal compound.

7. The process for producing a (co)polycarbonate as claimed in claim 1 wherein the basic catalyst is a mixture of a nitrogen-containing basic compound and a compound selected form the group consisting of an alkali metal compound and an alkaline earth metal compound.

* * * * *

UNITED STATES PATENT AND TRADEMARK OFFICE
CERTIFICATE OF CORRECTION

PATENT NO. : 5,494,992
DATED : February 27, 1996
INVENTOR(S) : Tatsuya Kanno et al It is certified that error appears in the above-indentified patent and that said Letters Patent is hereby corrected as shown below:

In the title page; change "[21] Appl. No.: 465,557" to
---[21] Appl. No.: 456,557---.

In the title page; add Item
   ---[30] Foreign Application Priority Data
   Jan. 29, 1993 [JP]    Japan...........5-13688
   Mar. 01, 1993 [JP]    Japan...........5-39606
   Apr. 16, 1993 [JP]    Japan...........5-89919   ---.

Signed and Sealed this

Twenty-fifth Day of June, 1996

Attest:

BRUCE LEHMAN

Attesting Officer    Commissioner of Patents and Trademarks